Nov. 9, 1965 D. S. HENRY 3,217,261
MONITORING SYSTEM FOR A VESTIGIAL SIDEBAND TRANSMITTER WHEREBY THE QUADRATURE COMPONENT IS ELIMINATED
Filed Aug. 27, 1963
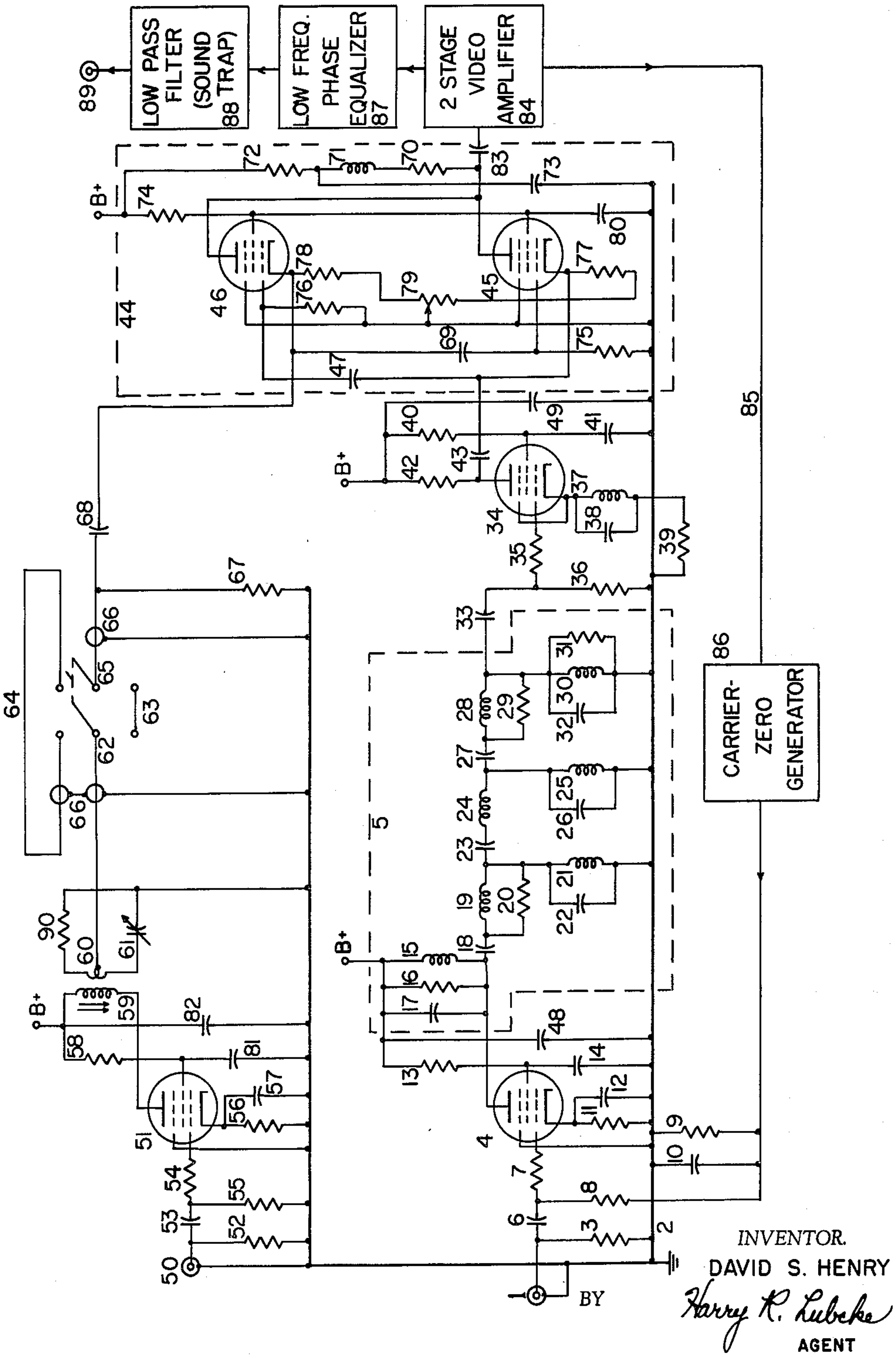
INVENTOR.
DAVID S. HENRY
BY Harry R. Lubcke
AGENT United States Patent Office 3,217,261

Patented Nov. 9, 1965

3,217,261

MONITORING SYSTEM FOR A VESTIGIAL SIDE-BAND TRANSMITTER WHEREBY THE QUADRATURE COMPONENT IS ELIMINATED

David S. Henry, 4971 Crown Ave., La Canada, Calif.

Filed Aug. 27, 1963, Ser. No. 304,884
11 Claims. (Cl. 329—50)

My invention relates to electrical demodulators and particularly to an electrical demodulator for demodulating electrical energy in which the sidebands thereof are asymmetrically attenuated.

The transmission of information by amplitude modulation in which one sideband is restricted in frequency with respect to the other is well known. This mode of transmission is employed in television broadcasting as a means of conserving frequency spectrum.

The demodulation of such transmissions involves unwanted distortions when envelope detection employing diodes is employed. Notwithstanding this known situation, leading demodulators commercially available for the important function of monitoring television transmitter performance have in the past and still do employ diode rectification. It may be assumed that it has heretofore been impossible to practically attain a superior means for demodulation monitoring.

I have provided a vestigial sideband demodulator which departs from the prior art as to method and apparatus. A passive band-pass filter first shapes the transmitter sideband energy according to that prescribed by system performance. A product detector then demodulates this energy and provides a true index of transmitter performance, regardless of the depth of the modulation or of other factors present in normal operation of the transmitter.

Employing the United States television standards for color as an example, it is necessary to shape the passed band before demodulation to more fully attenuate the unwanted sideband greater than three-fourths megacycle (mc.) below the carrier frequency. The sideband greater than one and one-fourth mc. below the carrier frequency is required by the standard to be attenuated only 20 db to as far as 3.58 mc. (the color subcarrier frequency). Demodulation before band-pass shaping, particularly with a diode, results in a combination of the upper and the lower sidebands so as to distort the recovered video signal. It is known that distortion long sought to be removed from a regularly operating television transmitter was found to be in a prior art commercial demodulator employed to monitor the transmiter. The true state of affairs was determined only when the demodulator disclosed herein was employed with the transmitter.

An object of this invention is to provide a vestigial sideband demodulator.

Another object is to provide a practical embodiment of a vestigial sideband demodulator which theoretically accomplishes distortionless demodulation.

Another object is to provide a vestigial sideband demodulator which has a passive band-pass filter for shaping sideband energy.

Another object is to provide a stable vestigial sideband demodulator in that it has relatively low gain.

Another object is to employ reference radio frequency energy from the radio frequency source which also supplies the vestigial sideband energy.

Another object is to provide a vestigial sideband demodulator which has a linear input-output characteristic down to zero radio frequency level.

Other objects will become apparent upon reading the following detailed specification and upon examining the accompanying drawing, in which is set forth by way of illustration and example an embodiment of my invention.

The drawing shows the schematic diagram for my vestigial sideband demodulator.

Numeral 1 indicates the input terminal for the modulated radio frequency, this energy being typically supplied as a voltage of the order of one volt from a transmission line, the outer conductor of which is connected to ground 2. Shunt resistor 3 terminates the transmission line and may have a resistance of the order of 75 ohms.

Vacuum tube 4 is provided to isolate band-pass filter 5 from the input circuit; the filter itself would not present a satisfactory termination to the transmission line. Capacitor 6 couples the signal from terminal 1 to the inner or conrol grid of tube 4 via anti-parasitic resistor 7. The former has a capacitance of the order of 500 picofarads (pf.) and the latter a resistance of the order of one hundred ohms. A grid return path to ground is provided by resistors 8 and 9 in series, each having a resistance value of the order of 30,000 ohms. Capacitor 10 bypasses the junction between these two resistors to ground and has a capacitance of the order of 1,000 pf.

The cathode of tube 4 is given a positive bias by resistor 11, being connected between the cathode and ground and having a resistance of 330 ohms. This resistor is shunted by capacitor 12, which has a capacitance of 500 pf. The screen grid of tube 4 is energized from a positive voltage supply terminal B+ through resistor 13, of 30,000 ohms. The terminal B+ represents the connection to the positive terminal of a known battery or power supply capable of providing direct current electrical energy at a voltage of the order of 250 volts. A bypass capacitor 48 is connected from B+ to ground 2 for usual isolation purposes. A capacitance value of 500 pf. is satisfactory.

Capacitor 14, also a bypass capacitor, connects from the screen grid of tube 4 to ground 2 and has a capacitance of 500 pf. The suppressor grid of tube 4 is connected to ground. The plate thereof is connected to one terminal of inductor 15, the other terminal of which is connected to the previously mentioned B+ terminal. Inductor 15 is the first of band pass filter 5. For operation on the United States television channel 2, which has a carrier frequency of 55.25 megacycles (mc.) for the visual carrier, inductor 15 has an inductance of one-half microhenry ($\mu$h.). Resistor 16 shunts inductor 15 and has a resistance of 8,000 ohms. Capacitor 17 also shunts inductor 15 and has a total capacitance of the order of 14 pf. The output capacitance of vacuum tube 4 is included in this value, thus, the capacitance of capacitor 17 itself is considerably less than 14 pf.

The above LCR combination represents the first such combination of band-pass filter 5, which may be a seven-pole no-zero Butterworth filter centered at 58.5 mc. (for channel 2).

Continuing the description of the filter; capacitor 18, of approximately 28 pf. capacitance, connects to the bottom terminal of inductor 15 and also to a shunt-connected combination of inductor 19, one-fourth microhenry, and resistor 20, 1,000 ohms. This combination is connected in turn to a shunt arm of the filter, which is composed of inductor 21, of one-tenth microhenry inductance, and capacitor 22, of 64 pf. capacitance; these two elements being connected in parallel and to ground 2. The next series arm of the filter is comprised of capacitor 23, 18 pf., and inductor 24, four-tenths microhenry; which are connected in series and to the top of inductor 21. The next shunt arm, composed of inductor 25 and capacitor 26, is a duplicate of shunt arm 21, 22 and is similarly connected. The next series arm 27, 28, 29 is a duplicate of series arm 18, 19, 20, with the exception that the resistance of resistor 29 is 1,500 ohms rather than 1,000 ohms. The final shunt arm 30, 31, 32 of the filter is composed of inductor 30 and capacitor 32 having the same values as the first shunt arm elements 15 and 17, but the resistance of resistor 31 is approximately five thousand ohms rather than eight thousand ohms as before. Capacitor 32 includes the circuit and tube capacitance, as has been explained.

The Q values of the inductances of this band-pass filter are an important factor in determining the proper pass band and these values are adjusted by changing the resistance values in parallel with the inducators. Also, unavoidable stray circuit capacitances and inductance of leads have an effect. Thus, exact values for the L, C and R's are best determined by slight adjustments in these values after the unit is constructed and its performance is under test.

Capacitor 33 provides coupling to vacuum tube 34 and has a capacitance of the order of 120 pf. Vacuum tube 34, as vacuum tube 4, provides isolation for filter 5. Both tubes may be of the 6AU6 type, as may all of the vacuum tubes shown in the drawing.

The modulated and now properly shaped sideband signal is conveyed to the control grid of tube 34 via resistor 35, of 100 ohms resistance.. Grid return resistor 36 connects from the junction between capacitor 33 and resistor 35 to ground and has a resistance of 100,000 ohms.

Inductor 37, of approximately one-fourth microhenry inductance, and capacitor 38, of 39 pf., are connected in parallel and to the cathode of tube 34. These form a trap to perfect the vestigial sideband shape by placing a high impedance in the cathode circuit of tube 34 at the frequency of 54 mc. (for channel 2). This effectively reduces the gain of the stage at that frequency and improves the linearity of the slope of the band pass filter 5 in the frequency region of high attenuation. Resistor 39 connects this parallel resonant circuit to ground and provides a positive bias for the cathode of tube 34 at all frequencies. A resistance value of 400 ohms is appropriate.

In the same manner as with tube 4, the screen grid of tube 34 connects to a B+ supply source through 30,000 ohms resistor 40. The screen grid is bypassed for signal frequencies by capacitor 41, which has a capacitance of 500 pf. The suppressor grid of tube 34 is connected to the cathode of that tube. The plate thereof is connected to plate resistor 42, of 600 ohms, and therethrough to the B+ terminal. A bypass capacitor 49 for that terminal, of 500 pf., connects therefrom to ground, as before. The signal output from tube 34 is taken through the capacitor 43. This is connected to the plate of the tube and has a capacitance of the order of 0.05 microfarad.

Product detector 44 is comprised principally of vacuum tubes 45 and 46. The modulated signal from tube 34 is applied directly to the cathode of tube 45 and through capacitor 47 of 0.22 mircofarad capacitance to the control (inner) grid of tube 46.

In order that distortionless detection take place in the produce detector it is required that it be supplied with a reference radio frequency. This is to be of the same frequency, phase, etc. as the radio frequency energy that is subsequently modulated in the remainder of the transmitter and which constitutes the signal that has already been considered.

A very simple and accurate way of obtaining this reference radio frequency energy is by obtaining the same from the last unmodulated stage in the transmitter being monitored, in a known manner to provide a radio frequency voltage amplitude of approximately one volt at reference signal input terminal 50. In this part of my demodulator vacuum tube 51 is provided for isolating product detector 44 from input 50 and to provide means for adjusting the demodulator, as will be considered later.

The radio frequency energy arriving at terminal 50 is typically conveyed there by a known coaxial cable having 75 ohm impedance and so resistor 52 preferably has a resistance of 75 ohms. It connects between terminal 50 and ground 2. This signal is then conveyed by coupling capacitor 53 of 300 pf. capacitance, to the control grid of tube 51 via anti-parasitic resistor 54 of 100 ohms resistance. Grid return resistor 55 connects from the junction between capacitor 53 and resistor 54 to ground. Resistor 56 connects between the cathode of tube 51 and ground to provide a positive basis on the cathode. A resistance value of approximately 300 ohms is satisfactory for this purpose. A capacitor 57 having a capacitance of 500 pf. shunts resistor 56, to provide a necessary bypass at the signal frequencies involved.

The screen grid of tube 51 is energized from a B+ terminal through resistor 58, which latter has a resistance of the order of 30,000 ohms. This is bypassed by capacitor 81, of 500 pf.; as is the B+ terminal by capacitor 82, also of 500 pf. capacitance.

The suppressor grid of tube 51 is connected to ground, as was the suppresssor grid of tube 4. The plate of tube 51 connects to a slug-tuned coil 59, having an inductance of approximately one-half microhenry, and through the coil to the B+ terminal. This coil is tuned with the distributed capacitance of tube 51 to the carrier frequency of the transmitter or equivalent radio frequency source. This frequency is 55.25 mc. for the present example. A two-turn center-tapped coil 60 is in close inductive relation to coil 59 and transforms the radio frequency energy in a step-down impedance ratio for the following circuit.

Coil 60 is tuned approximately to the carrier frequency by capacitor 61, which may be variable with a range of from 5 to 50 pf. The center-tap of coil 60 connects to the left-hand blade 62 of double-pole double-throw switch 63. The extremity of coil 60 that is not connected to capacitor 61 connects to resistor 90 and the opposite end of that resistor connects to capacitor 61 to form a series-tuned circuit which includes resistor 90. This circuit provides a means for varying the phase of the reference signal by approximately 135°. A resistance of 100 ohms is suitable for resistor 90. The junction between resistor 90 and capacitor 61 is connected to ground 2.

The center-tap connection provides reference radio frequency for the product detector, of a phase that can be controlled for fine adjustment. When switch 63 is in the downward position the shorting connection shown between the left-hand and the right-hand sides of the switch passes the reference energy through without modification. With the switch 63 in the upper position, however, it is seen that blade 62 is connected to the beginning of quarter-wave line 64, while blade 65 is connected to the end of that line. The line is a quarter-wavelength long at the carrier frequency; 55.25 mc. for the example under consideration. Switch 63 connects to the inner conductor of the coaxial cable forming the line. The outer conductor is represented by a loop, as 66, and this is connected to ground. Resistor 67 is connected to blade 65. It terminates line 64 in its characteristic impedance, as 75 ohms. Switch 63 is of small size, suitable for radio frequency switching by having a minimum of stray capacitance and is a device that is available commercially.

One of the advantages of the product detector is that it is unresponsive to a signal 90° out of phase with the applied signal. One of the distortions introduced by a vestigial sideband system is the so-called quadrature distortion; i.e., the introduction of a spurious component 90° out of phase with the desired signal. With a means for determining the exact phase of the distortion component the distortion can be eliminated by shifting the phase of the reference signal by 90°. It is the purpose of the quarter-wave line to change the phase of the reference signal applied to the product detector by 90° when switch 63 is changed from one position to the other.

In practice, the adjustment of capacitor 61 to make the produce detector respond to the undesired quadrature signal is much sharper than the adjustment required to tune to the desired in-phase signal. Therefore, capacitor 61 is adjusted with switch 63 in the upper position while observing the demodulated signal on a waveform monitor or oscilloscope for minimum low frequency amplitude. The synchronizing pulse component of the television signal is convenient for this observation. When this component is a minimum amplitude it may be assumed that the detector is reproducing only the quadrature components of the low frequency signal plus the higher frequency components which are not subject to quadrature distortion. The switch 63 is then changed to the lower position, removing the 90° line from the reference signal circuit and thus changing the phase of the reference signal by 90°. The product detector now reproduces only the desired in-phase signal and the quadrature component is eliminated.

Capacitor 68 is a coupling capacitor, as was capacitor 43, and both have the same capacitance. Capacitor 68 connects from blade 65 directly to the cathode of product detector tube 46 and through capacitor 69 to the control grid of product detector tube 45.

It is seen that the two inputs are symmetrically cross-connected to the product detector tubes. The mathematical analysis pertaining to these two tubes and the circuit connecting the same reveals that the only first order term in the common output is equal to twice the product of the input signals. This output voltage appears at the two connected-together plates of tubes 45 and 46. These plates are connected to the typical video amplifier plate impedance comprised of resistor 70, 750 ohms; inductor 71, 15 microhenries; and resistor 72, 15,000 ohms; all connected in series between the common plate connection and the B+ terminal. Capacitor 73 has a capacitance of five microfarads and in combination with resistor 72, from which resistor it is connected to ground, forms the known low-frequency compensating network.

The screen grids of both tubes 45 and 46, which tubes may be of the 6AU6 type, are connected together and to resistor 74, of 120,000 ohms resistance, and thence to B+. Each of the suppressor grids is connected to ground, as has been done before.

Symmetrical grid return resistors 75 and 76 are connected to the control grids of tubes 45 and 46, respectively, and to ground. Similarly, each cathode is connected to a separate resistor 77, 78, respectively, and the remaining terminals of each of these resistors are connected to the extremities of potentiometer 79, the wiper contact of which is connected to ground. Resistors 75 and 76 each may have resistances of 100,000 ohms; resistors 77, 78, each 500 ohms; and potentiometer 79, 1,000 ohms. Since signal voltages are not to be developed upon the screen grids of tubes 45 and 46, these are connected to capacitor 80, which is also connected to ground, and preferably has the relatively large capacitance of 20 microfarads because video frequencies are here involved in addition to the radio frequency inputs.

It is usual that the level of signal out of a demodulator of this type be approximately one volt, peak to peak. In order to provide this I include a known video amplifier 84, having a voltage amplification of the order of four and a bandwidth as required. Normally, this extends to approximately ten megacycles for images of high fidelity. The output plates from the product detector are connected to video amplifier 84 through coupling capacitor 83, the latter having a capacitance of one-tenth microfarad.

From the output of video amplifier 84 a connection 85 is taken to carrier-zero generator 86. The latter is a known device for reducing the modulated carrier to zero amplitude. This is accomplished in my demodulator by providing a 15 volt pulse of negative polarity for impressing upon the grid of initial vacuum tube 4 through grid return resistor 8. This pulse cuts-off tube 4 by exceeding the working bias of the control grid in the negative direction, as is known from vacuum tube first principles.

Carrier-zero generator 86 per se may be a mechanical means for providing such a negative pulse for each television image; i.e., each 30th or each 60th second, or it may be a relaxation oscillator circuit that is triggered by the known vertical synchronizing pulse of the television video signal. Additionally, the same may be delayed, if desired.

Circuit details of a relaxation oscillator circuit type carrier-zero generator 86 are given on page 8 and the accompanying circuit diagram in the Electronics Department, General Electric Co., Electronics Park, Syracuse, N.Y. Manual, Demodulator, Types TV–21–A, B, EBI–3126, published in November 1950; in which a blocking oscillator is used.

A phase equalizer 87 may be provided for the purpose of equalizing the phase of the demodulator as a whole to make this a linear function with respect to frequency. Because the carrier energy of the transmitter is reduced 6 db below the amplitude of the major sideband a phase distortion is caused in the demodulator. This has a maximum value of approximately one-tenth microseconds delay at low video frequencies with respect to nearly zero delay at approximately three megacycles in the video band for the United States vestigial sideband standard. Phase equalizer 87 is formed to have the inverse of this phase characteristic and so the combination results in constant and essentially linear phase delay with video frequency. Phase equalizer 87 may be two sections of a bridged T filter, with an inductor for the bridging element, capacitors for the top of the T section and an inductor connected in shunt across the filter as a whole for the stem section of the T.

In order that spurious interferences will not be passed through to the output of the demodulator, as from the 4.5 mc. higher frequency sound-channel transmitter of the usual television station, low pass filter 88 is connected to the output of video amplifier 84, as after equalizer 87. Filter 88 is typically a low pass filter or trap tuned to 4.5 mc. and having three LC parallel resonant series arms and two shunt capacitor arms.

Potentiometer 79 in the product detector is for balancing the same to compensate for slight differences in the tubes and circuit components. A balanced condition is conveniently determined by observing the shape of the zero carrier pulse as it appears in the video output at terminal 89. Potentiometer 79 is adjusted for a square top on this pulse and this insures balanced operation of the product detector. An unbalanced condition therein results in smear or streaking components in the demodulated video signal.

At video output terminal 89 there is thus obtained a demodulated signal for a vestigial sideband system that is free of distortion. If accurate amplitude adjustment of this output is desired this is accomplished by adjusting the amplitude of the modulated radio frequency input signal impressed upon terminal 1.

While this demodulator has been described by employing television broadcasting signals as an example, it will be understood that the demodulator is equally suited for vestigial sideband transmission of data for computers, for pulse-transmitted information and for equivalent systems. Also, although VHF radio frequencies and video modulation frequencies have been employed in the example, both of these frequency bands may be greatly modified without departing from the scope of this invention.

Still other modifications may be made in the characteristics of the circuit elements, details of circuit connections, alteration of the coactive relation between circuit elements, and values of voltages, etc. without departing from the scope of the invention.

Having thus fully described my invention and the manner in which it is to be practiced, I claim:

1. A vestigial sideband demodulator comprising;
(a) a passive band-pass filter to shape radio frequency energy according to said vestibial sideband,
(b) means to connect said filter to a source of modulated radio frequency energy,
(c) a single product detector having first and second vacuum tubes in a balanced circuit,
(d) means to connect said filter to a first electrode of said first vacuum tube and to a second electrode, of different type than said first electrode, of said second vacuum tube, and
(e) means to connect unmodulated reference radio frequency energy from said source of modulated radio frequency energy prior to the modulation thereof directly to a first electrode of said second vacuum tube and directly to a second electrode, of different type than said first electrode, of said first vacuum tube.

2. The demodulator of claim 1 in which;
(a) said first electrode is a control grid.

3. The demodulator of claim 1 in which;
(a) said second electrode is a cathode.

4. The demodulator of claim 1 in which;
(a) said means to connect reference radio frequency energy includes means to selectively interpose a phase shift in said reference radio frequency for adjusting said demodulator to minimum response to quadrature components of said modulated radio frequency energy.

5. The demodulator of claim 4 in which;
(a) said means to selectively interpose a phase shift includes a vacuum tube, and
(b) phase shift means to provide a ninety-degree phase shift connected to the output circuit of said vacuum tube.

6. The demodulator of claim 1 in which;
(a) said means to connect said filter to said first and second vacuum tubes includes a vacuum tube having a parallel-connected inductor-capacitor circuit resonant to a frequency within said vestigial sideband connected to the cathode of said vacuum tube.

7. The demodulator of claim 1 in which;
(a) said passive band-pass filter is a seven-pole no-zero Butterworth filter having plural series-connected inductor-capacitor series arms interposed between plural shunt-connected inductor-capacitor shunt arms.

8. The demodulator of claim 1 in which;
(a) a low pass filter having a cut-off at the frequency maximum of the highest vestigial sideband is connected to the output of the product detector to prevent spurious responses from a second source of modulated radio frequency energy having a frequency adjacent to said frequency maximum.

9. A vestigial sideband demodulator comprising;
(a) a passive band-pass filter to shape radio frequency energy according to said vestigial sideband,
(b) means to connect said filter to a source of modulated radio frequency energy,
(c) a product detector having first and second vacuum tubes in a balanced circuit, (d) means to connect said filter to a first electrode of said first vacuum tube and to a second electrode of said second vacuum tube,
(e) means to connect reference radio frequency energy derived from said source of modulated radio frequency energy prior to the modulation thereof to a first electrode of said second vacuum tube and to a second electrode of said first vacuum tube, and
(f) a carrier-zero generator connected from the output of said product detector to said means to connect said filter to a source of modulated radio frequency energy.

10. A vestigial sideband demodulator comprising;
(a) a passive band-pass filter to shape radio frequency energy according to said vestigial sideband,
(b) means to connect said filter to a source of modulated radio frequency energy,
(c) a product detector having first and second vacuum tubes in a balanced circuit,
(d) means to connect said filter to a first electrode of said first vacuum tube and to a second electrode of said second vacuum tube,
(e) means to connect reference radio frequency energy derived from said source of modulated radio frequency energy prior to the modulation thereof to a first electrode of said second vacuum tube and to a second electrode of said first vacuum tube, and
(f) a phase equalizer having the inverse characteristic of the demodulator connected to the output of the product detector to provide a linear phase characteristic for the demodulator.

11. Means for distortionless demodulation of vestigial sideband amplitude-modulated electrical energy which comprises;
(a) means to shape the amplitude of said modulated energy first as a function of frequency according to a given vestigial criterion,
(b) means to provide unmodulated electrical energy having the same phase as said modulated energy,
(c) means to temporarily alter the phase of said unmodulated electrical energy by ninety degrees,
(d) means to adjust this phase incrementally to obtain minimum low frequency demodulated output,
(e) means to return the phase of said unmodulated electrical energy by ninety degrees to approximately the original phase of said unmodulated electrical energy, and
(f) means to demodulate said vestigial sideband amplitude-modulated electrical energy by forming the first-order product of the same with said unmodulated electrical energy.

References Cited by the Examiner

UNITED STATES PATENTS

| | | | |
|---|---|---|---|
| 2,451,796 | 10/48 | Berkoff | 328—155 |
| 2,828,414 | 3/58 | Rieke | 325—331 |
| 2,985,840 | 5/61 | Theodore et al. | 329—50 X |

HERMAN KARL SAALBACH, *Primary Examiner.*

ALFRED L. BRODY, *Examiner.*